(12) United States Patent
Nishimoto et al.

(10) Patent No.: US 7,617,892 B2
(45) Date of Patent: Nov. 17, 2009

(54) UTILITY VEHICLE

(75) Inventors: Shuji Nishimoto, Amagasaki (JP);
Toshiyuki Hasegawa, Amagasaki (JP)

(73) Assignee: Kanzaki Kokyukoki Mfg. Co., Ltd.,
Hyogo (JP)

( * ) Notice: Subject to any disclaimer, the term of this patent is extended or adjusted under 35 U.S.C. 154(b) by 366 days.

(21) Appl. No.: 11/488,679

(22) Filed: Jul. 19, 2006

(65) Prior Publication Data

US 2007/0017729 A1    Jan. 25, 2007

(30) Foreign Application Priority Data

Jul. 19, 2005    (JP) .............................. 2005-208575

(51) Int. Cl.
*B60K 17/04*    (2006.01)
*B60K 17/28*    (2006.01)

(52) U.S. Cl. ...................... 180/53.4; 180/305; 180/374; 180/376

(58) Field of Classification Search ...................... 74/11, 74/15.2, 15.4, 15.6, 15.66, 15.69, 15.8, 15.82, 74/15.84, 15.86, 15.88; 180/53.1, 53.4, 53.5, 180/53.8, 305, 374, 376, 367, 375
See application file for complete search history.

(56) References Cited

U.S. PATENT DOCUMENTS

| | | | | |
|---|---|---|---|---|
| 3,104,528 A | * | 9/1963 | Horig | 60/426 |
| 3,131,580 A | * | 5/1964 | Forster | 74/720 |
| 3,204,468 A | * | 9/1965 | Ruoff | 74/15.4 |
| 4,191,270 A | * | 3/1980 | Monteith | 180/53.4 |
| 4,335,796 A | * | 6/1982 | Smith | 180/53.1 |
| 4,581,949 A | * | 4/1986 | Mann et al. | 74/15.4 |
| 4,667,536 A | * | 5/1987 | Ehrlinger et al. | 74/720 |
| 4,727,759 A | * | 3/1988 | Yamaoka et al. | 74/15.2 |
| 5,041,064 A | * | 8/1991 | Eickhoff et al. | 475/24 |
| 5,526,892 A | * | 6/1996 | Matsuda | 180/53.1 |
| 5,873,224 A | * | 2/1999 | Murakawa et al. | 56/11.4 |
| 5,913,950 A | * | 6/1999 | Matsufuji | 74/730.1 |
| 6,250,414 B1 | * | 6/2001 | Sato et al. | 180/307 |
| 6,457,546 B1 | * | 10/2002 | Ishimaru et al. | 180/305 |
| 6,530,855 B1 | * | 3/2003 | Folsom et al. | 475/72 |
| 6,860,358 B1 | * | 3/2005 | Hauser et al. | 180/305 |
| 6,874,305 B2 | * | 4/2005 | Ishimori | 56/10.8 |
| 7,089,824 B2 | * | 8/2006 | Nakatani et al. | 74/730.1 |
| 7,273,122 B2 | * | 9/2007 | Rose | 180/165 |
| 7,303,498 B2 | * | 12/2007 | Ishii et al. | 475/72 |
| 2003/0162618 A1 | * | 8/2003 | Hasegawa et al. | 475/72 |

FOREIGN PATENT DOCUMENTS

JP    2004-255918    9/2004

* cited by examiner

*Primary Examiner*—Paul N Dickson
*Assistant Examiner*—Laura Freedman
(74) *Attorney, Agent, or Firm*—Sterne, Kessler, Goldstein & Fox P.L.L.C.

(57) ABSTRACT

A utility vehicle comprises: a cargo; an engine disposed under the cargo, the engine including a fore-and-aft crankshaft; a lateral axle disposed under the cargo; a hydrostatic transmission (a hydraulic pump and a hydraulic motor) disposed under the cargo so as to transmit power from the engine to the axle; and a mechanical transmission (e.g., a planetary gear mechanism) disposed under the cargo so as to transmit power from the engine to the axle. The mechanical transmission includes a transmission shaft disposed in parallel to the axle. The hydrostatic transmission and the mechanical transmission are laterally juxtaposed. Therefore, the utility vehicle is minimized while ensuring a sufficiently large capacity of the cargo.

9 Claims, 6 Drawing Sheets

UTILITY VEHICLE

BACKGROUND OF THE INVENTION

1. Field of the Invention

The invention relates to a utility vehicle equipped with a cargo, under which a fore-and-aft oriented engine, a lateral axle, a hydrostatic transmission (hereinafter, referred to as "HST") for transmitting power from the engine to the axle, and a mechanical transmission (such as a gear transmission) are disposed. Particularly, the invention relates to the utility vehicle equipped with a PTO shaft so as to be connected to an optional working device.

2. Related Art

Conventionally, as disclosed in Japanese Laid Open Gazette No. 2004-255918, there is a well-known utility vehicle a utility vehicle equipped with a cargo, under which a fore-and-aft oriented engine, a lateral axle, a hydrostatic transmission (hereinafter, referred to as "HST") for transmitting power from the engine to the axle, and a mechanical transmission (such as a gear transmission) are disposed. The utility vehicle is equipped with a PTO shaft to be connected to an optional working device.

The fore-and-aft orientation of the engine is advantageous for efficiently transmitting power to the PTO shaft when the PTO shaft is disposed in the fore-and-aft direction so as to be drivingly connected to a working device disposed in front or rear of the vehicle. From this viewpoint, in the utility vehicle disclosed in the reference, a transmission casing disposed under the cargo supports the lateral axle, incorporates the mechanical transmission (gear transmission) in front of the axle, and incorporates the HST behind the axle. The fore-and-aft engine output shaft is inserted into the transmission casing so as to serve as a pump shaft of a hydraulic pump of the HST, and further projects rearward from a rear end of the transmission casing so as to serve as the PTO shaft.

However, with respect to the utility vehicle disclosed in the reference, the transmission casing is long in the fore-and-aft direction because transmission shafts of the mechanical transmission are extended in the fore-and-aft direction and the HST is disposed behind the axle. The fore-and-aft long transmission casing expands the fore-and-aft distance between front wheels and rear wheels so as to reduce the turnablity of the vehicle. Further, the HST is exposed rearward from the vehicle body so as to be disadvantageous in protection. Further, the rearward exposed HST restricts the downward rotatable range of a rear end of the cargo thereabove. To ensure a sufficient vertical rotatable range of the cargo, the cargo is required to have a considerably high bottom surface thereof, such as to reduce the capacity of the cargo.

SUMMARY OF THE INVENTION

An object of the invention is to provide a utility vehicle, equipped with a cargo having a capacity while reducing a fore-and-aft distance between front wheels and rear wheels for improving the turnability thereof, and equipped with a sufficiently protected HST.

To achieve the object, a utility vehicle comprises: a cargo; an engine disposed under the cargo, the engine including a fore-and-aft crankshaft; a lateral axle disposed under the cargo; an HST disposed under the cargo so as to transmit power from the engine to the axle; and a mechanical transmission disposed under the cargo so as to transmit power from the engine to the axle. The mechanical transmission includes a transmission shaft disposed in parallel to the axle, and the HST is disposed leftward or rightward from the mechanical transmission, i.e., the HST and the mechanical transmission are laterally juxtaposed.

Since the mechanical transmission includes a transmission shaft disposed in parallel to the lateral axle, the combination system of the HST and the mechanical transmission for transmitting power from the fore-and-aft engine to the axle is shortened in the fore-and-aft direction of the vehicle, so as to shorten the fore-and-aft distance between front wheels and rear wheels, thereby improving turnability of the vehicle. Further, the HST disposed leftward or rightward from the mechanical transmission is prevented from being exposed rearward, thereby being surely protected, and the HST is prevented from restricting the rotatable range of the cargo thereabove, thereby ensuring a sufficient capacity of the cargo.

Preferably, the utility vehicle further comprises a PTO drive train branching from a power train from the engine on the downstream side of both the HST and the mechanical transmission.

Therefore, a PTO shaft driven by this PTO drive train is changed in rotary speed and direction according to the traveling speed and direction control of the vehicle, i.e., synchronously to the output rotary speed and direction controlled by the HST or the mechanical transmission, so that the PTO drive train is adaptable for driving a working device requiring such a change of rotary speed and direction.

Preferably, the utility vehicle further comprises: a PTO shaft disposed in parallel to the crankshaft of the engine; and a drive train to the PTO shaft. The drive train branches from a power train from the engine on the upstream side of both the HST and the mechanical transmission.

Therefore, the PTO shaft and the drive train to the PTO shaft are fore-and-aft overlapped with the HST and the mechanical transmission so as to be prevented from being exposed rearward, thereby being surely protected, and they are prevented from restricting the rotatable range of the cargo thereabove, thereby ensuring a sufficient capacity of the cargo. The PTO shaft is adaptable to a working device to be rotated at a constant rate regardless of variation of the vehicle traveling speed, because it can be driven at a constant speed ratio to the engine rotary speed however the speed and direction of the output rotation from the HST or the mechanical transmission is changed.

Preferably, the utility vehicle including the PTO shaft disposed in parallel to the crankshaft of the engine further comprises a PTO drive train branching from a power train from the engine on the downstream side of both the HST and the mechanical transmission.

Therefore, another PTO shaft driven by the PTO drive train branching from the downstream side of the HST and the mechanical transmission is changed in rotary speed and direction according to the traveling speed and direction control of the vehicle, i.e., synchronously to the output rotary speed and direction controlled by the HST or the mechanical transmission, so that the PTO drive train is adaptable for driving a working device requiring such a change of rotary speed and direction. Therefore, the utility vehicle can drive both a working device to be driven at a constant speed regardless of speed change of the vehicle and a working device to be driven at variable speed corresponding to variation of the output rotary speed of the HST or the mechanical transmission.

Preferably, in any of the above-mentioned aspects of the utility vehicle, power of the engine is distributed between the HST and the mechanical transmission.

Therefore, the HST and the mechanical transmission are combined to drivingly assist each other, thereby serving as an HMT (hydrostatic and mechanical transmission).

These, other and further objects, features and advantages will appear more fully from the following description with reference to the accompanying drawings.

DETAILED DESCRIPTION OF THE INVENTION

Figure 1:
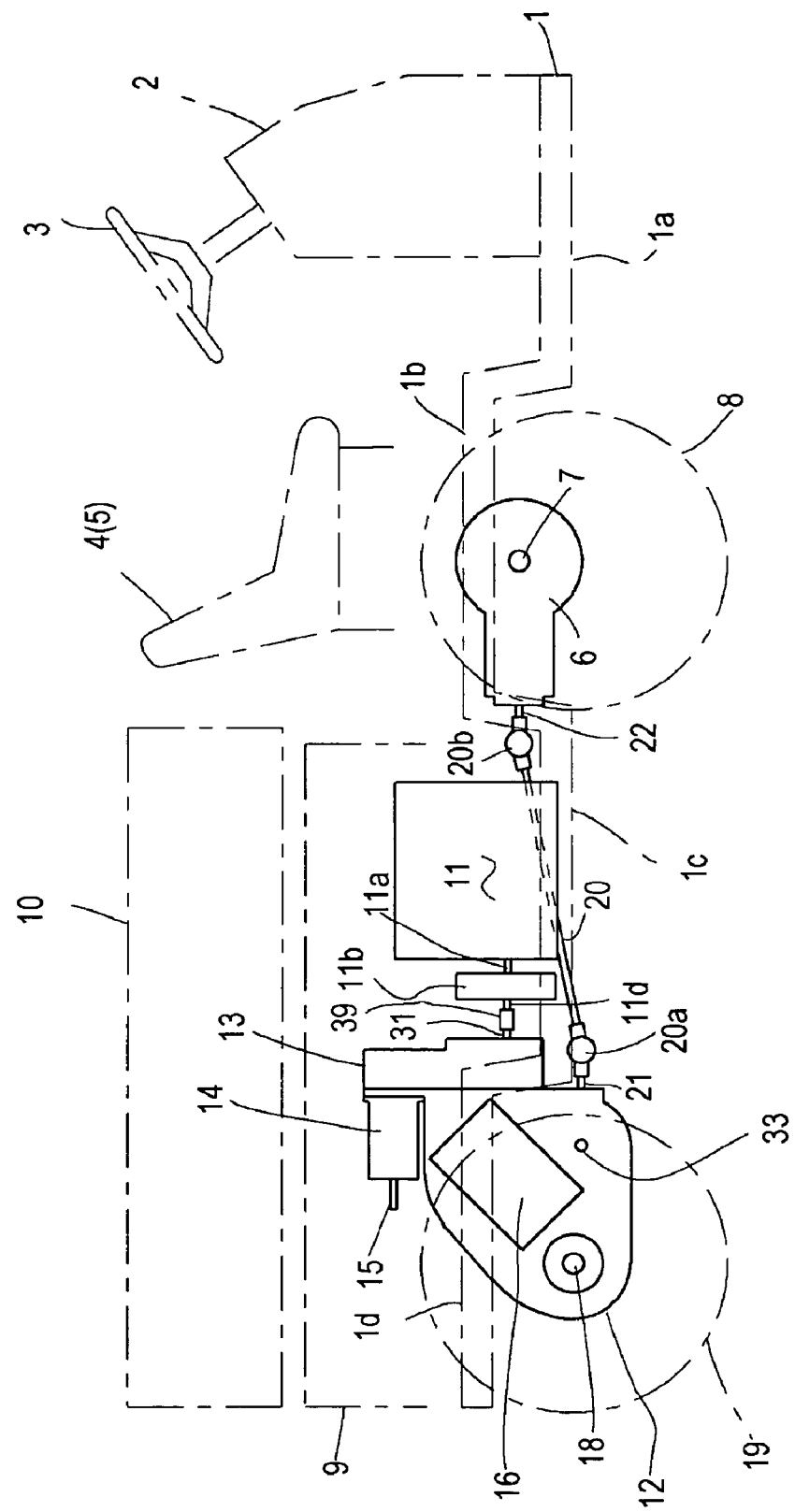
FIG. 1 is a side view of a utility vehicle according to the invention.
Figure 2:
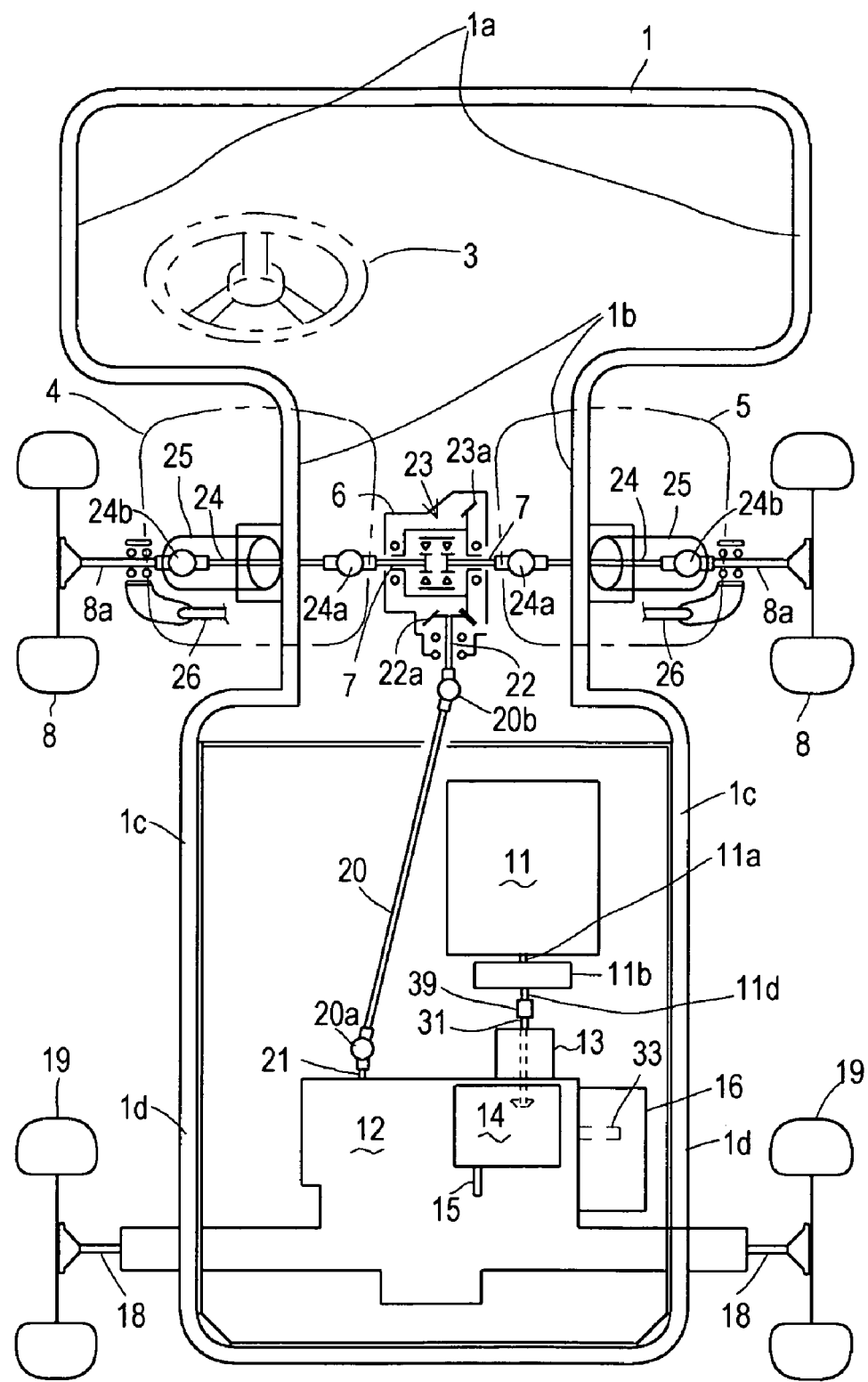
FIG. 2 is a schematic plan view of the utility vehicle.

Referring to FIGS. 1 and 2, an entire layout of a utility vehicle will be described. A vehicle frame 1 is formed with a front end portion 1a, a front-wheel support portion 1b disposed behind front end portion 1a, an engine mounting portion 1c disposed behind front-wheel support portion 1b, and a rear end portion 1d disposed behind engine mounting portion 1c, which are continuously joined to one another in series.

A front column 2 is mounted on front end portion 1a. Front-wheel support portion 1b is stepped to be higher than front end portion 1a. A driver's seat 4 and an assistant's seat 5 are juxtaposed left and right above front-wheel support portion 1b. A steering wheel 3 is extended upward from front column 2.

A front transaxle casing 6 is supported under front-wheel support portion 1b. Left and right front wheels 8 are disposed on the left and right outsides of front-wheel support portion 1b, and steerably and drivingly connected onto respective left and right axles projecting from front transaxle casing 6.

A rear cover 9 is mounted over engine mounting portion 1c and rear end portion 1d. A vertically rotatable cargo 10 is supported on the top of rear cover 9. Engine mounting portion 1c is stepped to be lower than front-wheel support portion 1b. An engine 11 having a fore-and-aft crankshaft is supported onto engine mounting portion 1c. Rear end portion 1d is stepped to be higher than engine mounting portion 1c. A transmission casing 12 is supported onto rear end portion 1d. A PTO gear casing 13 is continuously connected to a front end of transmission casing 12. A PTO clutch casing 14 is disposed just above transmission casing 12, and a horizontal rear PTO shaft 15 is extended rearward from PTO clutch casing 14. An HST casing 16 is attached onto one of left and right sides of transmission casing 12.

A horizontal engine output shaft (crankshaft) 11a projects rearward from engine 11, and a flywheel 11b is fixed onto a rear end of engine output shaft 11a. A horizontal input shaft 31 projects forward from transmission casing 12 disposed behind engine 11 so as to be connected to flywheel 11b through a dumper 11c (see FIGS. 3 and 4).

Rear cover 9 laterally and fore-and-aft encloses engine 11, transmission casing 12, PTO gear casing 13, PTO clutch casing 14 and HST casing 16. When cargo 10 covering the top of rear cover 9 is rotated upward, rear cover 9 is opened so as to facilitate connection or disconnection of a working device to and from rear PTO shaft 15.

Transmission casing 12 supports left and right axles 18 under rear end portion 1d. Rear wheels 19 fixed onto distal ends of respective axles 18 are disposed on respective left and right outsides of rear end portion 1d. The driving connection between axles 18 and rear wheels 19 may include universal joints so as to elastically suspend axles 18.

A horizontal ground PTO shaft 33 projects laterally outward from the left or right side of transmission casing 12 on which HST casing 16 is attached. Ground PTO shaft 33 disposed in front of axle 18. As shown in FIG. 1, HST casing 16 is disposed slantwise to be attached to transmission casing 12, so as to be prevented from interfering with ground PTO shaft 33.

Engine 11 is laterally eccentrically disposed toward one of left and right sides of the vehicle, as shown in FIG. 2. A propeller shaft 20 interposed between transmission casing 12 and front transaxle casing 6 is disposed on the other of the left and right sides of the vehicle. A horizontal front-wheel driving PTO shaft 21 projects forward from a front end of transmission casing 12. A horizontal front-wheel driving input shaft 22 projects rearward from a rear end of front transaxle casing 6. Propeller shaft 20 is connected at a rear end thereof to front-wheel driving PTO shaft 21 through a universal joint 20a, and connected at a front end thereof to front-wheel input shaft 22 through a universal joint 20b.

Here, PCT gear casing 13 continuously connected to the front end of transmission casing 12 is laterally eccentrically disposed toward the same left or right side of the vehicle with engine 11 behind engine 11, as shown in FIG. 2. Front-wheel driving PTO shaft 21 projecting from transmission casing 12 is laterally eccentrically disposed toward the right or left side of the vehicle opposite to the side with PCT gear casing 13 and engine 11, and extended just under engine mounting portion 1c, as shown in FIG. 1. On the other hand, front-wheel driving input shaft 22 supported by front transaxle casing 6 is disposed at the substantially lateral middle portion of the vehicle, as shown in FIG. 2, and disposed at the vertical middle height position between engine mounting portion 1c and front-wheel support portion 1b. As shown in FIGS. 1 and 2, propeller shaft 20 is slanted so as to correspond to the vertical and lateral positional difference between shafts 21 and 22.

A bi-directional clutch type differential unit 23 is disposed in front transaxle casing 6 so as to differentially connect front axles 7 to each other. A bevel bull gear (input gear) 23a of differential unit 23 meshes with a bevel gear 22a fixed on a front end of front-wheel driving input shaft 22. During normal travel of the vehicle, differential unit 23 is clutched off so as to prevent the rotation of bull gear 23a (the power of engine 11) from being transmitted to axles 7, whereby the vehicle travels by only the driving force of rear wheels 19, i.e., by two-wheel drive. If any of front wheels 8 and rear wheels 19 slips so as to reduce the rotary speed of front wheels 8 to a level lower than that of bull gear 23a, differential unit 23 is clutched on so as to transmit power to front wheels 8, thereby putting the vehicle into a four-wheel drive mode. The drive mode selection between the two-wheel drive mode and the four-wheel drive mode is enabled whether the vehicle travels forward or backward.

A propeller shaft 24 is interposed between a distal end of each axle 7 and a center axial shaft 8a of each front wheel 8 through universal joints 24*a* and 24*b*, so as to drivingly connect each steerable front wheel 8 to each axle 7. Left and right suspension mechanisms 25 suspend respective left and right front wheels 8 from vehicle frame 1. A tie rod 26 is operatively connected to steering wheel 3, and connects left and right front wheels 8 to each other.

Figure 3:
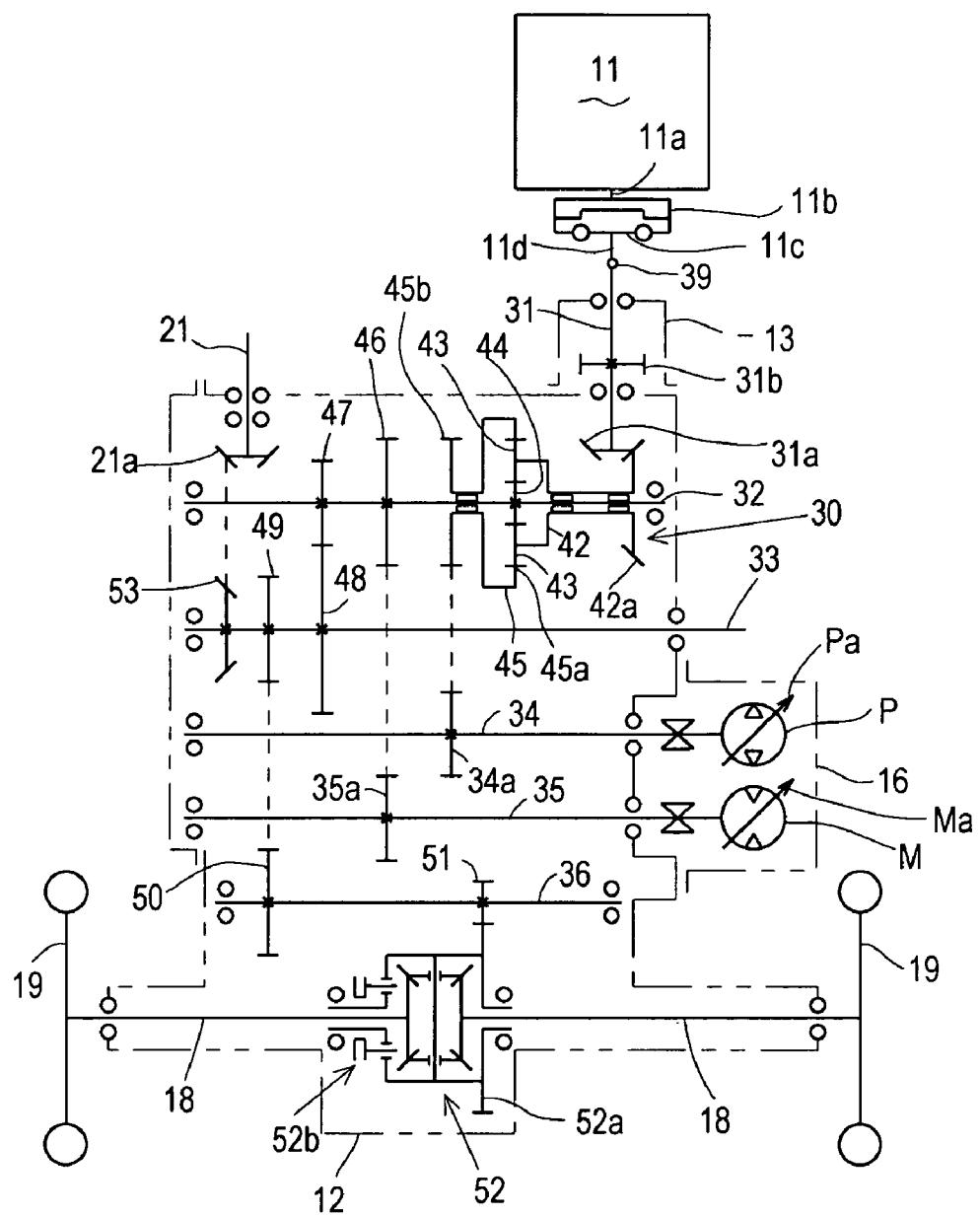
FIG. 3 is a skeleton diagram of a transmission system in a transmission casing.
Figure 6:
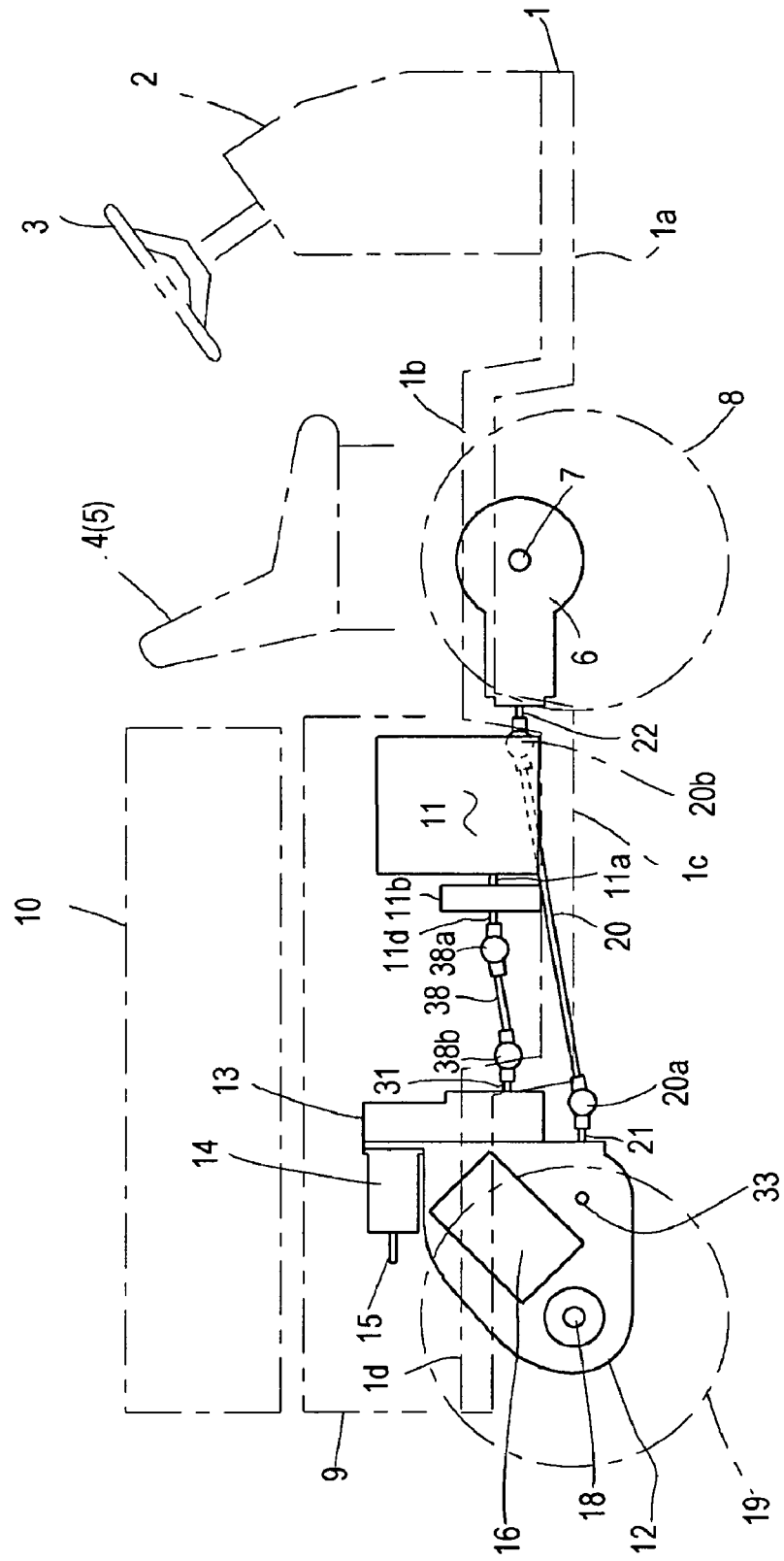
FIG. 6 is a side view of a utility vehicle according to the invention, provided with a propeller shaft and universal joints interposed between an engine output shaft and an input shaft of the transmission casing.

An interior structure of transmission casing 12 will be described with reference to FIGS. 3 and 4. Output shaft 11*d* connected to flywheel 11*b* through dumper 11*c* is extended rearward so as to be connected to an input shaft 31 through a joint 39. Input shaft 31 penetrates PTO gear casing 13 in the fore-and-aft direction, and is inserted into transmission casing 12 so as to be fixedly provided at a rear end thereof with a bevel gear 31*a*. Alternatively, if transmission casing 12 is fixed onto vehicle frame 1 and engine 11 is elastically supported onto vehicle frame 1, or if the rotary axis of flywheel 11*b* of engine 11 (i.e., the axis of output shafts 11*a* and 11*d*) does not coincide to the rotary axis of input shaft 31, a propeller shaft 38 replacing joint 39 may be interposed between output shaft 11*d* and input shaft 31, as shown in FIG. 6, so that propeller shaft 38 is connected at a front end thereof to output shaft 11*d* through a universal joint 38*a*, and at a rear end thereof to input shaft 31 through a universal joint 38*b*.

In transmission casing 12, a sun gear shaft 32, a counter shaft 33, a pump shaft 34, a motor shaft 35 and a pinion shaft 36 are journalled in parallel to axles 18. When viewed in side as shown in FIG. 4, counter shaft 33 is disposed below sun gear shaft 32, more specifically, slightly forward from a position just vertically downward from sun gear shaft 32. Pinion shaft 36 is disposed behind counter shaft 33, and axles 18 are disposed behind pinion shaft 36. Counter shaft 33 projects from one of the left and right sides of transmission casing (the same side with HST casing 16) so as to serve as ground PTO shaft 33.

Due to the vertical offset of sun gear shaft 32 and counter shaft 33, transmission casing 12 is fore-and-aft shortened. Sun gear shaft 32 is disposed upwardly forward from axles 18, so that, when viewed in side as shown in FIG. 4, a line segment between the center of sun gear shaft 32 and the center of axles 18 is slanted upwardly forward. A pump shaft 34 and a motor shaft 35 are juxtaposed along this slanted line segment, thereby enabling a rear surface of transmission casing 12 to be slanted upwardly forward. Therefore, transmission casing 12 is minimized, and a satisfactorily large space behind the rear surface of transmission casing 12 is ensured for connecting a working device to rear PTO shaft 15 disposed above transmission casing 12.

In HST casing 16, a variable displacement hydraulic pump P and a variable displacement hydraulic motor M are disposed so as to be fluidly connected to each other. Pump shaft 34 of hydraulic pump P and motor shaft 35 of hydraulic motor M are extended so as to be journalled in transmission casing 12. In transmission casing 12, a gear 34*a* is fixed on pump shaft 34, and a gear 35*a* is fixed on motor shaft 35.

A carrier 42 is relatively rotatably fitted on sun gear shaft 32. A bevel gear 42*a* is formed or fixed on one end portion of carrier 42, and meshes with bevel gear 31*a* on the rear end of input shaft 31. Planetary gears 43 are pivoted on the other end portion of carrier 42 opposite to bevel gear 31*a*, and mesh with a sun gear 44 fixed on sun gear shaft 32. Carrier 42 is rotated synchronously to input shaft 31 driven by the engine power, so as to revolve planetary gears 43 around sun gear 42.

An outer member 45 is relatively rotatably fitted on sun gear shaft 32 opposite to carrier 42 with respect to planetary gears 43. Outer member 45 is formed with an internal gear 45*a* meshing with planetary gears 43. Outer member 45 is formed or fixedly provided on an end portion thereof with a gear 45*b* meshing with gear 34*a* on pump shaft 34. A gear 46 is fixed on sun gear shaft 32 and meshes with gear 35*a* on motor shaft 35. In this way, a planetary gear mechanism 30 is configured around sun gear shaft 32, and drivingly connected to pump shaft 34 and motor shaft 35 of the HST (hydraulic pump P and motor M) through meshing gears, thereby constituting an HMT.

The rotary force of carrier 42 rotatably following input shaft 31 is transmitted to pump shaft 34 through planetary gears 43, internal gear 45*a*, outer member 45, and gears 45*b* and 34*a*, thereby driving hydraulic pump P. Hydraulic pump P delivers fluid to hydraulic motor M so as to rotate motor shaft 35. The rotary force of motor shaft 35 is transmitted to sun gear shaft 32 through gears 35*a* and 46. The rotary force of carrier 42 is also transmitted to sun gear shaft 32 through planetary gears 43 and sun gear 44 so as to assist the driving force transmitted from motor shaft 35 to sun gear shaft 32.

A diametrically small gear 47 is fixed on sun gear shaft 32, a diametrically large gear 48 is fixed on counter shaft 33, and gears 47 and 48 mesh with each other. A gear 49 is fixed on counter shaft 33, a gear 50 is fixed on pinion shaft 36, and gears 49 and 50 mesh with each other. A final pinion 51 is fixed on pinion shaft 36, and meshes with a bull gear 52*a* of a differential unit 52. In this way, a deceleration gear train from gear 47 to final pinion 51 through gears 48, 49 and 50 is interposed between sun gear shaft 32 serving as an output shaft of the HMT and pinion shaft 36 serving as an input shaft of differential unit 52.

Differential unit 52 differentially connects left and right axles 18 to each other, and is provided with a differential lock mechanism 52*b*. When differential lock mechanism 52*b* is activated, axles 18 are mutually locked, i.e., rotatably integral with each other.

With respect to the speed control of the vehicle, hydraulic pump P is provided with a movable swash plate Pa, and hydraulic motor M is provided with a movable swash plate Ma. By selecting the slant direction of movable swash plate Pa between a forward-traveling slant direction and a backward-traveling slant direction opposite to each other with respect to a neutral position of movable swash plate Pa, the fluid delivery direction of hydraulic pump P is determined so as to determine the rotation direction of motor shaft 35, whereby sun gear shaft 32, counter shaft 33 and pinion shaft 36 are determined in their rotation directions, thereby determining whether axles 18 rotate forward or backward. By setting movable swash plate Pa of hydraulic pump P at the neutral position, motor shaft 35 is stopped so as to stop axles 18.

A movable swash plate Ma of hydraulic motor M is held at an initial slant angle while movable swash plate Pa moves up to its maximum slant angle. When movable swash plate Pa reaches the maximum slant angle and a speed higher than that corresponding to the maximum slant angle of movable swash plate Pa (i.e., corresponding to the maximum displacement of hydraulic pump P) is required, the slant angle of movable swash plate Ma is reduced smaller than the initial slant angle, so as to reduce the displacement of hydraulic motor M, thereby increasing the rotary speed of motor shaft 35.

Movable swash plates Pa and Ma are operatively connected to a speed control manipulator. Additionally, movable swash plates Pa and Ma may be operatively connected to an accelerator pedal for controlling an engine throttle valve, so that they are automatically controlled according to the engine speed control so as to correspond to a set engine speed.

A bevel gear 53 is fixed on counter shaft 33, a bevel gear 21*a* is formed (or fixed) on a rear end of fore-and-aft front-wheel driving PTO shaft 21 journalled by a front wall portion of transmission casing 12, and bevel gears 53 and 21a mesh with each other. Since counter shaft 33 is driven by the output force from the HMT (on the downstream side of the HMT), the rotary speeds and directions of front-wheel driving PTO shaft 21, propeller shaft 20 and front-wheel driving input shaft 22 are variable according to the traveling speed and direction control of the vehicle, i.e., synchronously to variation of the rotary speed and direction of axles 18. Consequently, the rotary speed of the ground PTO shaft made of counter shaft 33 for driving a working device is variable according to the traveling speed and direction control of the vehicle, i.e., synchronously to variation of the rotary speed and direction of axles 18.

A power transmission system from input shaft 31 to rear PTO shaft 15 will be described. In PTO gear casing 13, a fore-and-aft counter shaft 27 is journalled above fore-and-aft input shaft 31, and a fore-and-aft clutch shaft 28 is journalled above counter shaft 27. In PTO gear casing 13, a first gear 31b is fixed on input shaft 31, a second gear 27a is fixed on counter shaft 27, and a third gear 28a is fixed on clutch shaft 28. Second gear 27a meshes with first gear 31b, and also meshes with third gear 28a, so as to constitute a PTO deceleration gear train including gears 31b, 27a and 28a.

An upper front wall portion 12a of transmission casing 12 is extended upward so as to have a top end leveled with a top end of PTO gear casing 13 attached to the front wall of transmission casing 12. PTO clutch casing 14 is cantilevered rearward from a rear surface of upper front wall portion 12a. A fore-and-aft horizontal clutch shaft 28 is extended rearward from PTO gear casing 13, penetrates upper front wall portion 12a of transmission casing 12, and is journalled in PTO clutch casing 14.

In PTO clutch casing 14, clutch shaft 28 and rear PTO shaft 15 are laterally juxtaposed in parallel, a PTO clutch 29 is disposed around clutch shaft 28, and a gear 15a fixed on rear PTO shaft 15 meshes with a clutch gear 29a of PTO clutch 29. When PTO clutch 29 is clutched on, clutch gear 29a becomes rotatably integral with clutch shaft 28, so as to allow the rotation of clutch shaft 28 to be transmitted to rear PTO shaft 15. When PTO clutch 29 is clutched off, clutch gear 29a is separated from clutch shaft 28 so as to isolate rear PTO shaft 15 from the rotational force of clutch shaft 28.

Figure 4:
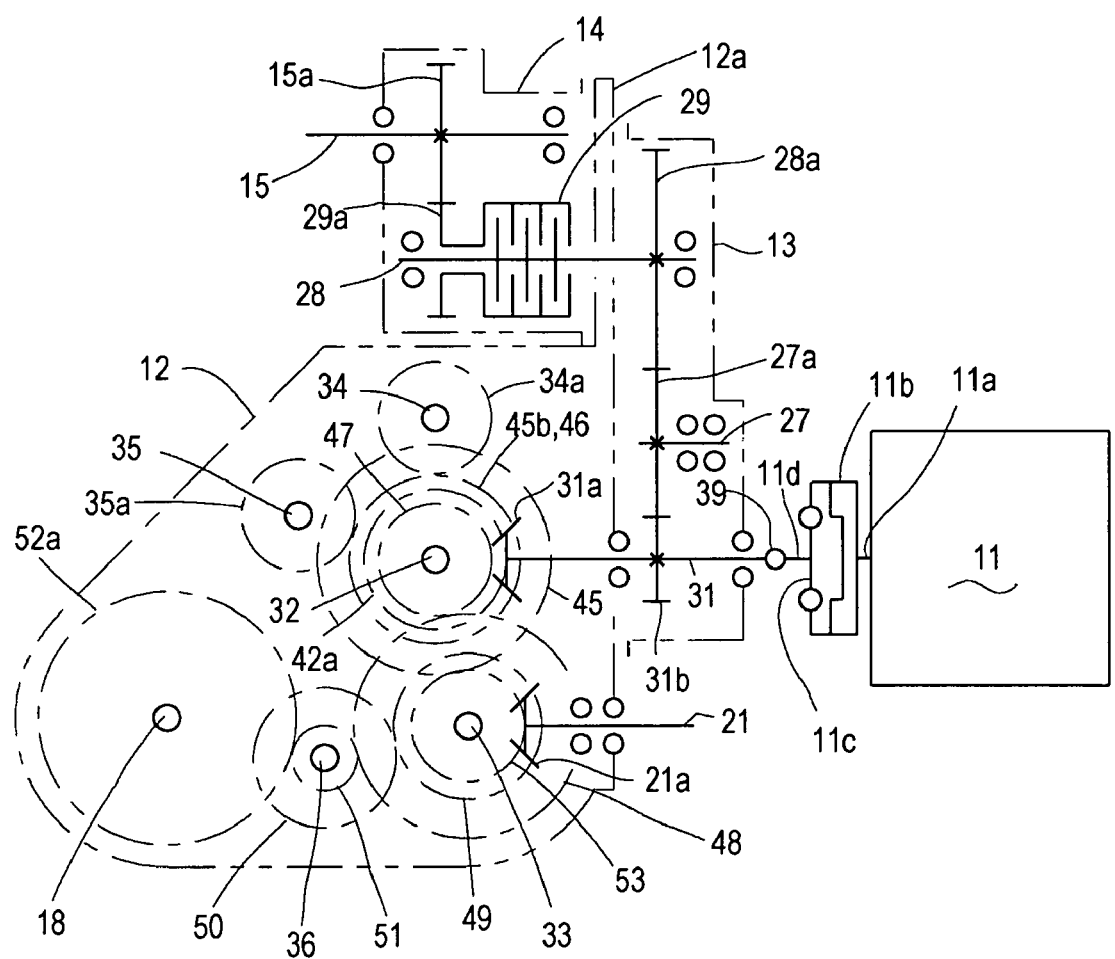
FIG. 4 is a schematic side view of a transmission system of the utility vehicle showing arrangement of transmission shafts and gears in power trains from an engine to an axle, a rear PTO shaft, a ground PTO shaft and a front-wheel driving PTO shaft.

Incidentally, in the developed view of the interior structure of PTO clutch casing 14 of FIG. 4, rear PTO shaft 15 with gear 15a thereon is illustrated as being disposed above clutch shaft 28 with PTO clutch 29, however, the fact is that rear PTO shaft 15 and clutch shaft 28 are laterally juxtaposed. Rear PTO shaft 15 projects rearward from PTO clutch casing 14.

PTO clutch casing 14 incorporating clutch shaft 28, PTO clutch 29, rear PTO shaft 15 and gears 29a and 15a serves as an assembly unit to be detachably attached onto upper front wall portion 12a of transmission casing 12. When PTO clutch casing 14 is attached onto upper front wall portion 12a, a forward projecting front portion of clutch shaft 29 is passed through upper front wall portion 12a and inserted into PTO gear casing 13 so as to be connected to third gear 28a.

The power train from input shaft 31 to rear PTO shaft 15 is configured as mentioned above. Rear PTO shaft 15 is rotated at a constant speed ratio to the engine speed and in a fixed direction relative to the engine rotary direction regardless of the traveling speed and direction control of the vehicle, because rear PTO shaft 15 is driven by the rotation of input shaft 31 before the rotary speed and direction is determined by the HMT, i.e., the combination of the HST (including hydraulic pump P and motor M) and planetary gear mechanism 30 (including planetary gears 43, sun gear 44 and internal gear 45a) serving as a mechanical transmission. Therefore, rear PTO shaft 15 is adaptable for driving a working device to be driven at a substantially constant speed regardless of the traveling speed and direction of the vehicle.

On the other hand, as mentioned above, the ground PTO shaft made of counter shaft 33 is driven by the rotation after its direction and speed are determined by the HMT. Therefore, the ground PTO shaft is adaptable for driving a working device whose rotary speed and direction are to be changed synchronously to the traveling speed and direction change of the vehicle.

Figure 5:
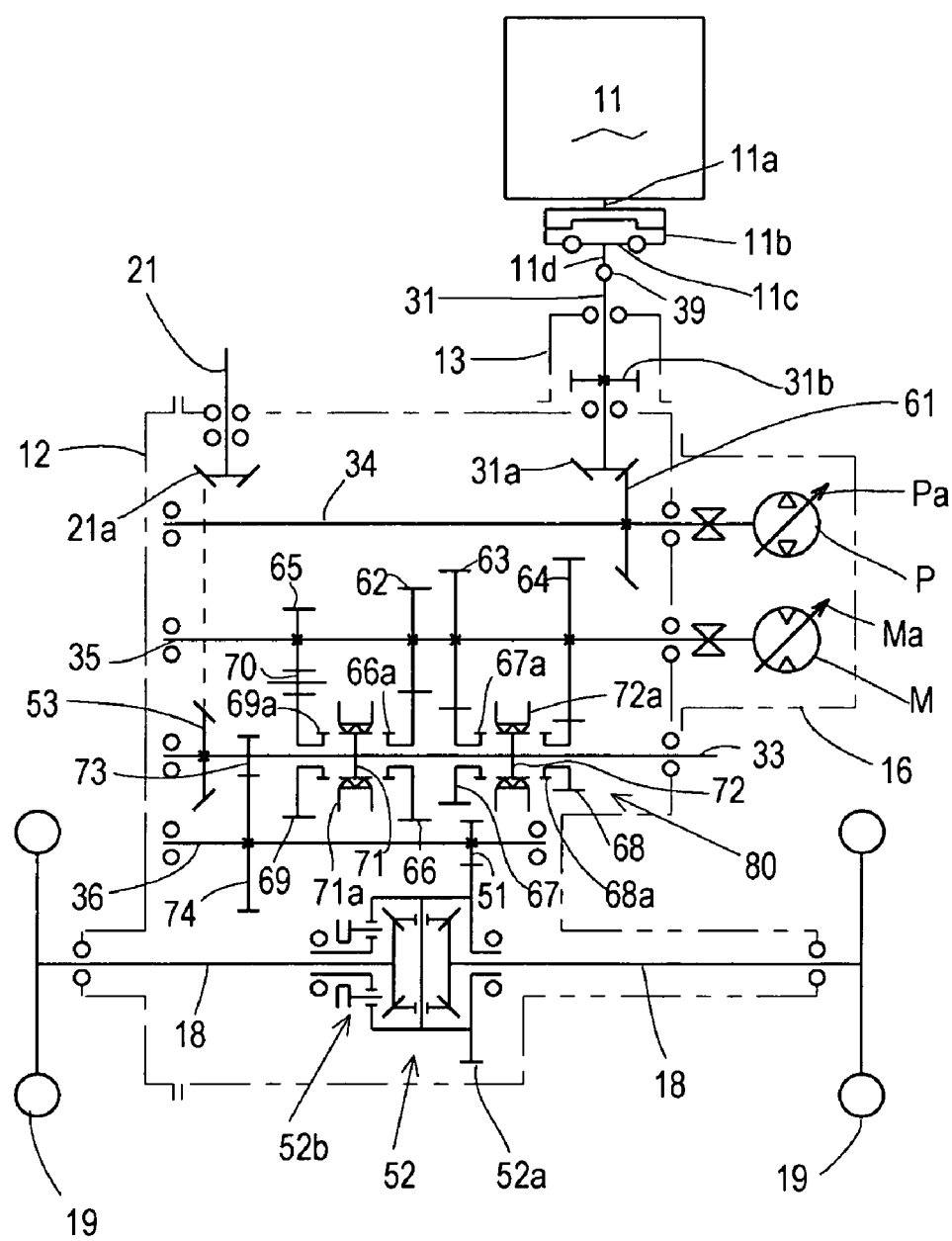
FIG. 5 is a skeleton diagram of a transmission system in the transmission casing according to a second embodiment.

A transmission system in transmission casing 12 according to a second embodiment will be described with reference to FIG. 5. Description of portions and members designated by the same reference numerals as those in FIGS. 3 and 4 will be omitted, except for a specified case, because they have the same functions as those in the above embodiment of FIGS. 3 and 4.

Fore-and-aft input shaft 31 is extended from engine 11 (more specifically, through output shaft 11a, flywheel 11b, dumper 11c and output shaft 11d) and inserted into transmission casing 12. Pump shaft 34, motor shaft 35, counter shaft 33 and pinion shaft 36 are disposed laterally of the vehicle, and journalled in transmission casing 12 so as to serve as a group of transmission shafts for transmitting the rotary force of input shaft 31 to laterally extended axles 18. Output shaft 11d and input shaft 31 may be connected to each other through joint 39 as shown in FIG. 1, or alternatively, through propeller shaft 38 and universal joints 38a and 38b as shown in FIG. 6.

In this embodiment, the HST including hydraulic pump P and motor M serves as a main speed control transmission, and an auxiliary speed control gear transmission 80 is interposed between motor shaft 35 and counter shaft 33 so as to transmit the output force from the HST to differential unit 52. Namely, the HST and the mechanical transmission, i.e., gear transmission 80, are connected in series.

Pump shaft 34 is extended from hydraulic pump P in HST casing 16 and inserted into transmission casing 12 so as to be fixedly provided thereon with a bevel gear 61 meshing with bevel gear 31a. Motor shaft 35 is extended from hydraulic motor M in HST casing 16 and inserted into transmission casing 12 so as to be fixedly provided thereon with a low speed normal driving gear 62, a middle speed normal driving gear 63, a high speed normal driving gear 64 and a reverse driving gear 65, serving as a group of driving gears of auxiliary speed control gear transmission 80. Therefore, input shaft 31 drives pump shaft 34, and hydraulic motor M is driven by the delivery fluid from hydraulic pump P driven by pump shaft 34, thereby rotating driving gears 62, 63, 64 and 65 fixed on motor shaft 35 serving as the output shaft of hydraulic motor M.

In this embodiment, hydraulic pump P and motor M are variable in displacement, such as to have respective movable swash plates Pa and Ma. The slant angle of movable swash plate Ma of hydraulic motor M is changeable when movable swash plate Pa of hydraulic pump P reaches the maximum slant angle. These are the same features of hydraulic pump P and motor M in the above embodiment. The different point of the second embodiment from the above embodiment is that movable swash plate Pa of hydraulic pump P can be tilted only in the slant angle range for forward traveling because the HST does not require a mechanism for selection of forward/backward traveling direction due to auxiliary speed control gear transmission 80 including a gear train for backward traveling of the vehicle.

In transmission casing 12, counter shaft 33 is relatively rotatably provided thereon with a low speed normal driven gear 66, a middle speed normal driven gear 67, a high speed normal driven gear 68 and a reverse driven gear 69. Gear 66 meshes with gear 62 fixed on motor shaft 35 so as to constitute a low speed forward traveling gear train. Gear 67 meshes with gear 63 fixed on motor shaft 35 so as to constitute a middle speed forward traveling gear train. Gear 68 meshes with gear 64 fixed on motor shaft 35 so as to constitute a high speed forward traveling gear train. Gears 65 and 69 mesh with each other through an idle gear 70 so as to constitute a backward traveling gear train. In this way, auxiliary speed control gear transmission 80 includes the four gear trains, and one of the four gear trains can be optionally selected to drive axles 18.

A spline hub 71 is fixed (relatively unrotatably fitted) on counter shaft 33 between reverse driven gear 69 and low speed normal driven gear 66. A spline hub 72 is fixed (relatively unrotatably fitted) on counter shaft 33 between middle speed normal driven gear 67 and high speed normal driven gear 68. A shifter 71a is axially slidably and relatively unrotatably fitted on spline hub 71. A shifter 72a is axially slidably and relatively unrotatably fitted on spline hub 72.

Driven gears 66, 67, 68 and 69 are formed with respective clutch teeth 66a, 67a, 68a and 69a facing respective spline hubs 71 and 72. One of clutch teeth 66a, 67a, 68a and 69a is selectively engaged with corresponding shifter 71a or 72a so as to relatively unrotatably engage the corresponding driven gear with counter shaft 33. For example, when shifter 71a meshes with clutch teeth 66a, low speed normal driven gear 66 relatively unrotatably engages with counter shaft 33, so as to transmit the rotary force of motor shaft 35 to counter shaft 33 through the low speed forward traveling gear train including gears 62 and 66, thereby rotating counter shaft 33 at a low speed and in one direction for forward traveling of the vehicle. When shifter 71a meshes with clutch teeth 69a, reverse driven gear 69 relatively unrotatably engages with counter shaft 33, so as to transmit the rotary force of motor shaft 35 to counter shaft 33 through the backward traveling gear train including gears 65, 70 and 69, thereby rotating counter shaft 33 in the other direction for backward traveling of the vehicle. Additionally, counter shaft 33 can be isolated from the rotary force of motor shaft 35 by separating both shifters 71a and 72a from any of clutch teeth 66a, 67a, 68a and 69a, i.e., by making a neutral state of auxiliary speed control gear transmission 80.

A gear 73 is fixed on counter shaft 33, a gear 74 is fixed on pinion shaft 36, and gears 73 and 74 mesh with each other so as to constitute a deceleration gear train. The rotary force of counter shaft 33, after transmitted through the HST and auxiliary speed control gear transmission 80, is transmitted through the deceleration gear train to final pinion 51 meshing with bull gear 52a of differential unit 52.

In this embodiment, front-wheel driving PTO shaft 21 is drivingly connected to counter shaft 33 through meshing bevel gears 53 and 21a, and the end of counter shaft 33 projects outward from transmission casing 12 so as to serve as the ground PTO shaft. PTO gear casing 13 is disposed between engine 11 (more specifically, flywheel 11b) and transmission casing 12. PTO clutch casing 14 is supported onto the upper portions of PTO gear casing 13 and transmission casing 12 and supports rear PTO shaft 15 to be driven by the rotary force of input shaft 31. These features are similar to those in the above embodiment shown in FIGS. 3 and 4.

INDUSTRIAL APPLICABILITY

The present utility vehicle is minimized while equipped with a cargo having a sufficiently large capacity. The utility vehicle is also provided with a PTO shaft for driving various working devices. Various type utility vehicles may serve as the present utility vehicle. For example, the utility vehicle can be adapted for traveling on an uncultivated land.

What is claimed is:

1. A utility vehicle comprising:
   a cargo area;
   an engine disposed under the cargo area, the engine including a crankshaft extended in the fore-and-aft direction of the vehicle;
   a pair of right and left axles extended in the right-and-left direction of the utility vehicle, the right and left axles being coaxial to each other and disposed under the cargo area;
   a differential unit disposed coaxially to the right and left axles under the cargo area so as to differentially connect the right and left axles to each other;
   a mechanical gear transmission casing disposed under the cargo area;
   a mechanical gear transmission disposed in the mechanical gear transmission casing so as to transmit power from the engine to the differential unit, the mechanical gear transmission including
      a transmission shaft extended parallel to the right and left axles, and
      a gear provided on the transmission shaft so as to transmit power from the transmission shaft to the differential unit;
   a hydrostatic transmission casing disposed on either right or left side of the mechanical gear transmission casing under the cargo area; and
   a hydrostatic transmission disposed in the hydrostatic transmission casing so as to transmit power from the engine to the differential unit, the hydrostatic transmission including
      a hydraulic pump having a pump shaft extended parallel to the right and left axles, wherein the pump shaft enters the mechanical gear transmission casing so as to receive power from the engine, and
      a hydraulic motor fluidly connected to the hydraulic pump, the hydraulic motor having a motor shaft extended parallel to the right and left axles and the pump shaft, wherein the motor shaft enters the mechanical gear transmission casing so as to transmit power thereof to the transmission shaft of the mechanical gear transmission.

2. The utility vehicle according to claim 1, the mechanical gear transmission further including:
   a power distribution means which distributes power of the engine in parallel between the pump shaft of the hydrostatic transmission and the transmission shaft of the mechanical gear transmission.

3. The utility vehicle according to claim 1, further comprising:
   a power take-off (PTO) drive train to which a part of power of the transmission shaft is branched and transmitted so as to drive a working device.

4. The utility vehicle according to claim 3, the mechanical gear transmission further including:
   a power distribution means which distributes power of the engine in parallel between the pump shaft of the hydrostatic transmission and the transmission shaft of the mechanical gear transmission.

5. The utility vehicle according to claim 1, further comprising:
   a power take-off (PTO) shaft disposed in parallel to the crankshaft of the engine so as to drive another axle; and a drive train to the PTO shaft, wherein the drive train branches from a power train from the engine on the upstream side of both the hydrostatic transmission and the mechanical gear transmission.

6. The utility vehicle according to claim 5, the mechanical gear transmission further including:
a power distribution means which distributes power of the engine in parallel between the pump shaft of the hydrostatic transmission and the transmission shaft of the mechanical gear transmission.

7. The utility vehicle according to claim 5, further comprising:
a second PTO drive train to which a part of power of the transmission shaft is branched and transmitted so as to drive a working device.

8. The utility vehicle according to claim 7, the mechanical gear transmission further including:
a power distribution means which distributes power of the engine in parallel between the pump shaft of the hydrostatic transmission and the transmission shaft of the mechanical gear transmission.

9. The utility vehicle according to claim 1, wherein the mechanical gear transmission and the hydrostatic transmission are both disposed forward of the right and left axles and the differential unit.

* * * * *